INVENTORS
Imre Adler
Robert M. Frank
Nelson G. Erhardt

BY John L. Shortley
ATTORNEY

Dec. 21, 1965  I. ADLER ETAL  3,224,604
TRANSVERSE DRIVE FOR RECLAIMER
Filed May 27, 1963  3 Sheets-Sheet 2
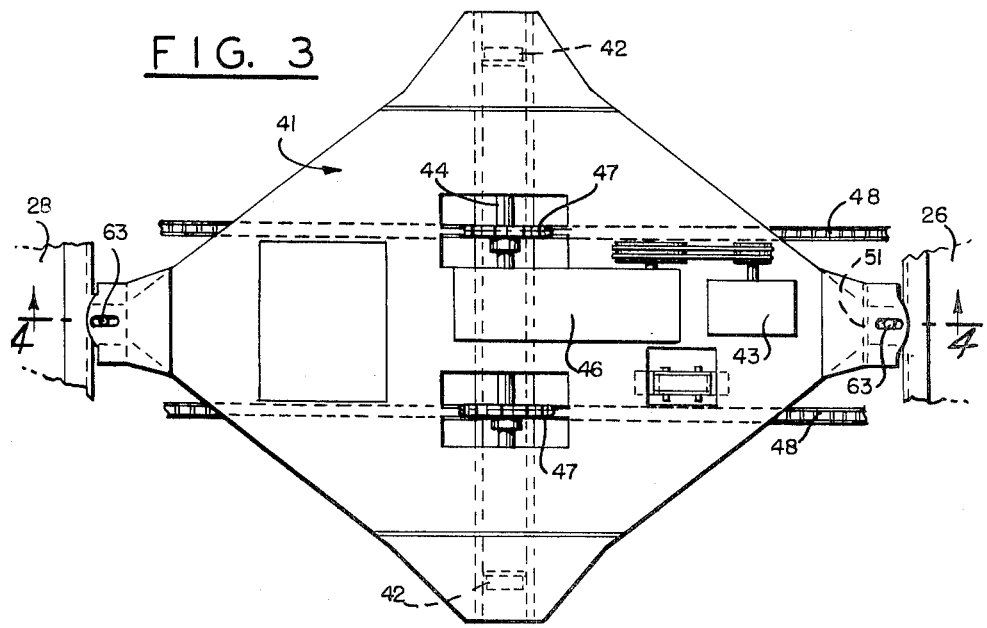
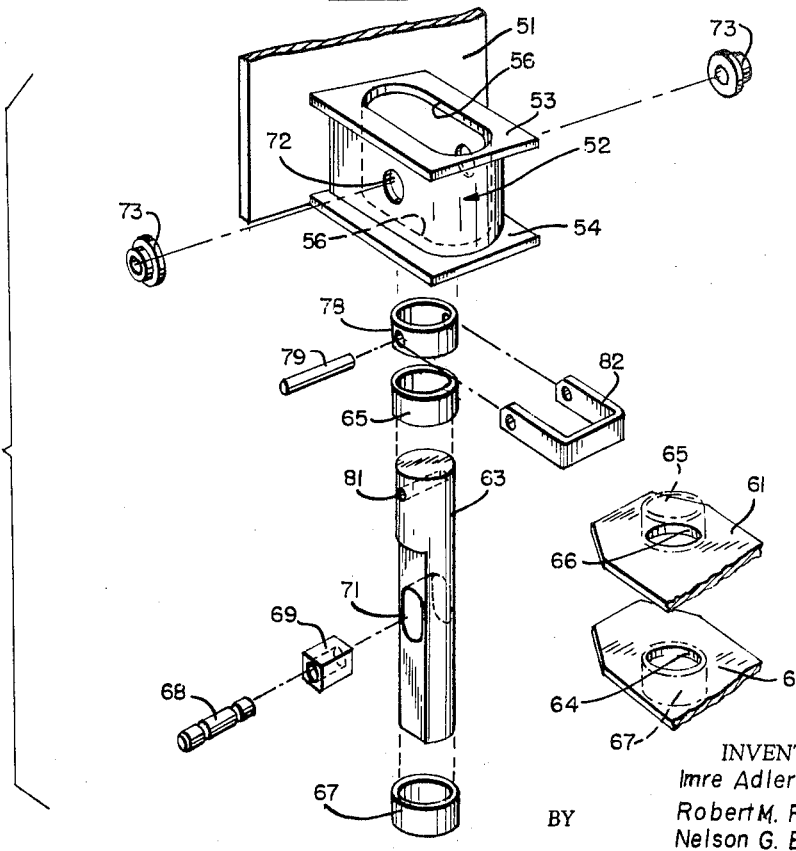
INVENTORS
Imre Adler
Robert M. Frank
Nelson G. Erhardt
BY
John L. Shortley
ATTORNEY Dec. 21, 1965     I. ADLER ETAL     3,224,604
TRANSVERSE DRIVE FOR RECLAIMER
Filed May 27, 1963     3 Sheets-Sheet 3

INVENTORS
Imre Adler
Robert M. Frank
Nelson G. Erhardt

BY

John L. Shortley
ATTORNEY

United States Patent Office 3,224,604
Patented Dec. 21, 1965

3,224,604
TRANSVERSE DRIVE FOR RECLAIMER
Imre Adler, New York, N.Y., Nelson G. Erhardt, Wayne, N.J., and Robert M. Frank, Larchmont, N.Y., assignors to Litton Industries, Inc., a corporation of Delaware
Filed May 27, 1963, Ser. No. 283,449
9 Claims. (Cl. 214—10)

The present invention relates to apparatus for removing granular material from a storage pile and more particularly pertains to equipment which includes two relatively large wheels each equipped with buckets and mounted for rotation while supported on a carriage and the invention is directed to means intermediate the wheel carriages and connected to each with a drive mechanism mounted on the intermediate means which serves to pull one of the wheel carriages and to push the other wheel carriage lengthwise of the bridge structure and thereby move the wheel carriages transversely of the pile from which granular material is to be reclaimed and the invention includes means for interrupting the supply of power to the drive mechanism when the load imposed on one of the connections between the carriages rises above a predetermined level.

It is often necessary to store granular materials such as coal, ore and other particles in a layered bed having the form of an elongated pile. The granular material is added to the bed in such a manner that the particles roll and tumble and assume angles of repose which determines the side and the end faces of the pile. Such steps promote blending of the particles. In removing such granular material from the pile it is desirable to further blend the material as much as possible. One type of apparatus that has been employed for recovering the material from the pile takes the form of a wheel type reclaiming machine wherein buckets on the wheel dig into the end face of the pile and any granular material that may have been stratified when the pile was formed is regrouped in an integrated manner by the reclaimer in removing the material from the pile. Two bucket wheels operating together and forming elements of the apparatus for removing the material from the pile promote further blending of the reclaimed material and increase the capacity of the apparatus.

It is an object of the present invention to provide apparatus for removing granular material from a storage pile which includes two bucket wheel units each of which is supported by a carriage and both are adapted to move transversely of the pile while being supported on a bridge member which spans the area from which the granular material is to be reclaimed and to provide apparatus wherein an intermediate carriage maintains the two wheel carriages in substantially fixed spaced relationship also provides structure supporting driving means moving both bucket wheel units transversely of the pile.

A more specific object of the invention is to provide a carriage which rolls on the tracks of the bridge structure intermediate the carriages which support the bucket wheel units with the intermediate carriage connected to each whereby the bucket wheel units need not be equipped with drive means for moving them longitudinally of the bridge structure.

Another object of the invention is to provide means in association with the intermediate carriage and in association with the connection of the intermediate carriage with the bucket wheel unit serving to interrupt the supply of power to a prime mover which propels the units transversely of the pile when there is failure of a frangible type of connection between the intermediate carriage and one of the bucket wheel units.

Other objects and features of the invention will become apparent and will be appreciated by those skilled in the art to which the invention pertains as the present disclosure proceeds and upon consideration of the following detailed description taken in conjunction with the accompanying drawings wherein an embodiment of the invention is disclosed.

In the drawings:

FIG. 3 is an enlarged plan view of the intermediate carriage showing the connections to the wheel carriages.

FIG. 4 is an enlarged view of the intermediate carriage partly in section and taken on the line 4—4 of FIG. 3.

FIG. 5 is an exploded perspective view of an assembly which includes a frangible pin for connecting one end of the intermediate carriage to one of the wheel carriages.

FIG. 6 is a perspective view showing structural elements which serve to interrupt an electrical circuit to the driving motor.

FIG. 7 is a diagrammatic and schematic view illustrating a portion of the circuit to the driving motor.

Figure 1:
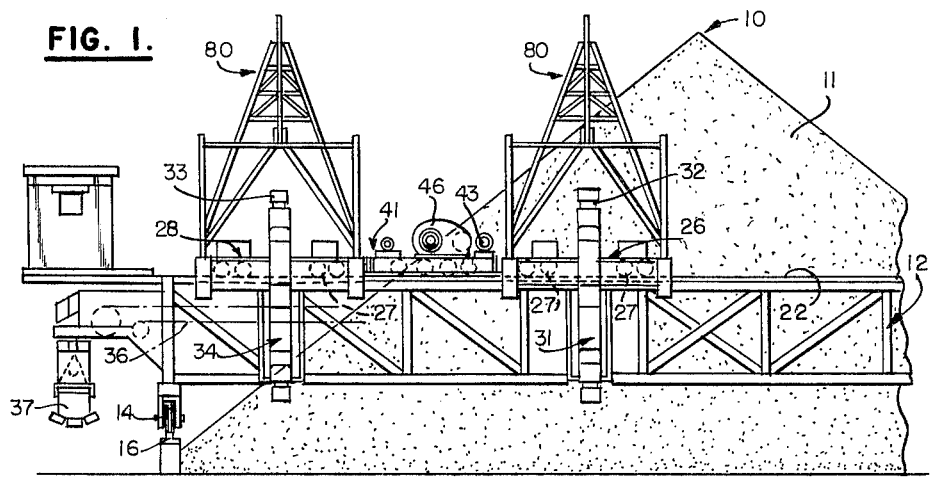
FIG. 1 is a side elevational view of a portion of reclaiming apparatus embodying the invention.
Figure 2:
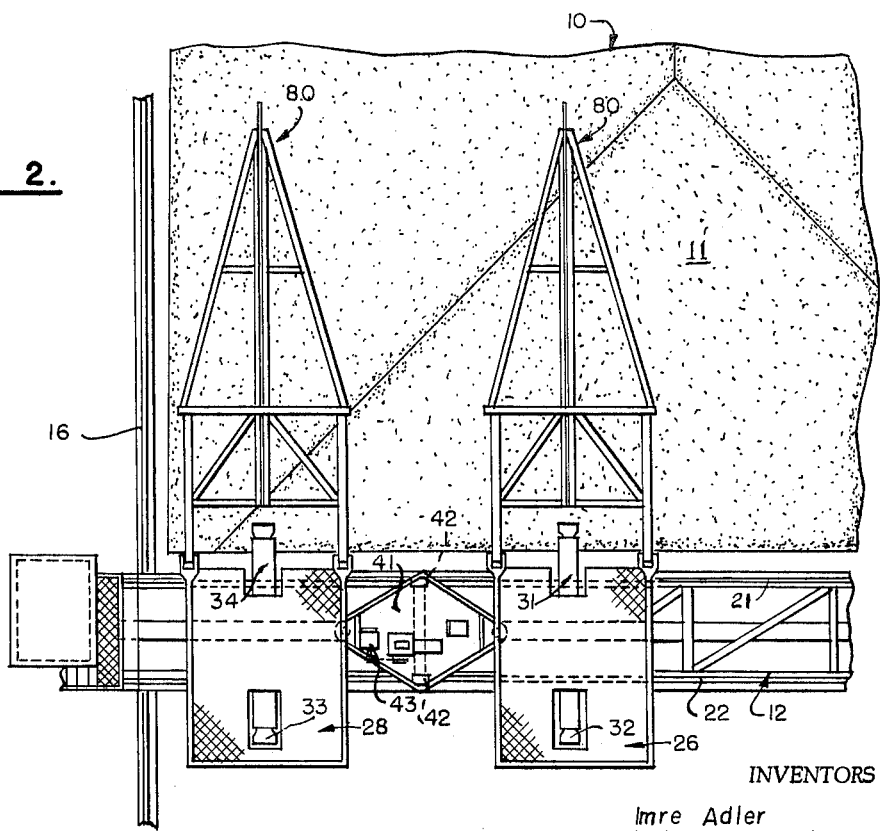
FIG. 2 is a plan view of the structure shown in FIG. 1.

An elongated pile of granular material which has been deposited in a manner to promote blending of the particles is indicated at 10 having side faces which are formed by particles seeking their angle of repose and the pile has a sloping end face 11 which is created by the particles rolling or tumbling at the end of the pile and it is from this face that the granular material is reclaimed. Apparatus for removing the granular material from such a pile 10 includes a bridge structure 12 which may be of conventional construction and has such a length as to span the width of the pile 10. The ends of the bridge member 12 are supported by wheels 14 which roll on tracks 16 which extend lengthwise along opposite sides of the pile 10. The structure of the bridge member 12 and the manner in which it is supported for bodily movement lengthwise of the pile may take various forms. Any suitable means may be provided for moving the bridge structure on the rails 16 so as to bring the bucket wheels of the reclaiming mechanism into operative relationship with the face 11 of the pile.

The bridge structure 12 is equipped with railway type rails 21 and 22 which extend throughout the length thereof. In apparatus exhibiting the invention a carriage 26 is equipped with railway type wheels 27 which roll on the rails 21 and 22 and provide support for the carriage 26 in its movements transversely of the pile and lengthwise of the bridge member. Another and second carriage 28 is equipped with railway type wheels 27 which roll on the rails 21 and 22 and provides support for the second carriage. The carriages 26 and 28 are thus supported for guided movements on and lengthwise of the bridge member 12. A relatively large bucket wheel 3 is supported for rotation by the carriage 26 so that the bucket wheel 31 may rotate in the plane of the wheel 31. The wheel 31 is equipped with buckets 32 which are adapted to dig into the granular material and lift it during continued rotation of the bucket wheel. A similar wheel 34 is supported for rotation by the carriage 28. The wheel 34 is equipped with buckets 33 which are adapted to dig into the granular material and lift it during continued rotation of the wheel 34. A conveyor 36 of the endless type is supported on the bridge structure 12 and located to receive the granular material discharged from the buckets of the wheels 31 and 34 in a known manner. The conveyor 36 moves the granular material to one end of the bridge member where it is discharged into other conveyances such as the conveyor 37.

The carriage 26 supports motors and transmission means for driving the bucket wheel 31. The carriage 28 provides support for motors and transmission means for driving the bucket wheel 34. The present invention makes it unnecessary to equip the carriage 26 or the carriage 28 with any means for moving these wheel units longitudinally of the bridge member 12. An intermediate carriage 41 provides support for substantially all of the equipment for moving the bucket wheel units along the rails 21 and 22. The intermediate carriage 41 is provided with axially aligned railway type wheels 42 which roll on the tracks 21 and 22 and provide two points of support for the intermediate carriage. The truss type bridge structure 12 has some camber and one end of the intermediate carriage 41 is coupled to the carriage 26 and the other end of the intermediate carriage 41 is coupled to the carriage 28. These couplings hereinafter described in detail maintain the intermediate carriage 41 in a substantially horizontal position on its wheels 42. All three of the carriages are supported by the respective wheels for rolling movements over the rails 21 and 22 which arch slightly and follow the camber of the bridge structure and the wheel loads are determinate. An electric motor 43 of the reversible type is supported on the intermediate carriage 41 and mounted on the platform thereof. It drives a transversely disposed shaft 44 (FIG. 3) through a suitable transmission mechanism and reduction gearing encased in a housing 46. The shaft 44 is journalled for rotation on the carriage 41 and two sprocket wheels 47 are secured to the shaft 44. A pair of sprocket chains 48 which have their ends anchored in any suitable and equalized manner to the respective ends of the bridge structure 12 are trained about the sprocket wheels 47 and idler wheels 49 (FIG. 4). Thus rotation of the shaft 44 serves to move the intermediate carriage 41 longitudinally of the bridge structure 12 and opposite rotation of the shaft 44 serves to move the intermediate carriage 41 in the other direction longitudinally of the bridge member 12.

The end portions of the intermediate carriage 41 are generally of triangular shape in plan as best shown in FIG. 3. A vertically disposed plate 51 at each end of the intermediate carriage 41 carries a housing 52 which includes vertically spaced horizontally disposed plates 53 and 54 as best shown in FIG. 5. The plates 53 and 54 have vertically aligned slots 56 therein which are elongated lengthwise of the bridge member 12. Each wheel carriage 26 and 28 is equipped at its end adjacent the carriage 41 with vertically spaced horizontally disposed plates 61 and 62. The plate 61 is adapted to overlie the plate 53 in spaced relation and the plate 62 is adapted to underlie the plates 54 of the housing 52 in spaced relation. A pin 63 extends through a circular opening 64 in the plate 62 and through the slots 56 in the housing 52 and through a circular opening 66 in the plate 61. The pin 63 at its ends is accommodated in collars 65 and 67 carried by the plates 61 and 62.

The pin 63 is normally prevented from moving horizontally relative to the intermediate carriage 41 within the slots 56 by means of a shear pin 68 which extends through a sleeve 69 which is accommodated in a vertically elongated slot 71 in the intermediate portion of the pin 63. The slot 71 is of greater vertical dimensions than those of the sleeve 69 so that there may be limited vertical movements of the pin 63 relative to the shear pin 68 without imposing any stress on the shear pin 68. The ends of the shear pin 68 extend through openings 72 in the sides of the housing 52 and the ends of the shear pins are secured in bearing members 73 disposed at opposite sides of the housing 52. A ring 78 fits over the upper end of the pin 63 and a key 79 extends through openings in the ring 78 and through a transverse opening 81 in the pin 63. A bale 82 has openings receiving the end portions of the key 79. This assembly retains the pin 63 in a proper vertical position and provides means for facilitating the positioning of pin 63 during the insertion of the shear pin 68.

A similar housing and pin assembly is provided at each end of the intermediate carriage 41 providing a hinged connection between the wheel carriages 26 and 28 and the intermediate carriage 41. The pin 63 is desirable in alignment with the center line between the tracks 21 and 22. Each of the pin and housing assemblies provide a pivotable connection for transmitting pushing and pulling forces from the intermediate bridge member 41 to the wheel carriages 26 and 28. In operation and with the bucket wheel units moving from left to right in FIG. 1 the pin and housing assembly between the intermediate carriage 41 and the wheel carriage 26 serves to push this reclaiming unit while the pin and housing unit at the other end of the intermediate carriage 41 serves to pull the trailing wheel carriage 28. The forces transmitted from the intermediate carriage to the wheel carriages are through the shear pins 68 each of which is designed to handle the normal forces of pushing and pulling the associated wheel carriage. Any obstruction which blocks the normal movement of either wheel carriage transversely of the pile or any obstruction arresting movement of either of the harrows 80 will cause the pin 68 to break and allow relative movement of the vertically disposed pin 63 within the elongated slots 56.

Such relative movement according to the present invention is utilized to interrupt the supply of power to the motor 43. An elongated frame member 86 is rigidly supported at each end of the intermediate carriage 41 by means of a bracket 87. An arm 88 carried by each wheel carriage extends into one of the frame members 86. A chain or other non-extensible flexible element 89 extends from the arm 88 to one member 91 of a two-part separable electric plug element. The other part 92 is attached to the frame member 86. Another two-part electric plug assembly is arranged at the opposite side of the arm 88. One part 93 is fixed to the frame member 86 and the other part 94 is attached to a flexible inextensible element such as a chain 96 attached to the arm 88.

In operation and assuming that the wheel carriage 26 is being pushed to the right in FIG. 4 by the action of the intermediate carriage 41 and in the event of some obstruction which would cause the shear pin 68 in the hinged connection at the right in FIG. 4 to break there would be a relative movement of the arm 88 to the left relative to the frame member 86. Such movement causes the part 91 of the two-part plug assembly to break a power circuit 97 extending to the motor 43 which serves to push the wheel carriage 26 and to pull the carriage 28. In operation and when the wheel carriage 26 is being pulled to the left in FIG. 4 by action of the intermediate carriage 41 and in the event of some obstruction which would cause the shear pin in the hinge connection at the right in FIG. 4 to break there would be relative movement of the arm 88 to the right relative to the frame member 86. Such movement would cause the part 94 of the plug assembly to disengage the part 93 and break the power circuit 97 extending to the motor 43 and which serves to pull the wheel carriage 26 and to push the wheel carriage 28. A similar assembly is provided in the hinge connection between the wheel carriage 28 and the intermediate carriage 41. The mechanical connection between the intermediate carriage 41 and the respective wheel carriage is, nevertheless, maintained because the ends of the pin 63 extend through the slots 56 in the housing member 52. The vertical pins 63 permit skewing of the intermediate carriage 41 with respect to the carriage 26 and skewing of the carriage 28 with respect to the carriage 41 within limits of the rails 21 and 22 and the clearance of the flanges of the supporting wheels.

The hinged connection between opposite ends of the intermediate carriage 41 and the respective reclaiming units permits limited vertical movements of the intermediate carriage relative to the wheel carriages to adapt the assembly to any irregularities in the tracks 21 and 22 and camber of the bridge structure. Any vertical movement beyond that permitted by the elongated slot 71 such as that taking place if one of the carriages should be untracked from the rails 21 and 22 provides sufficient vertical movement to shear the pin 68. Breakage of the pin 68 permits the vertically disposed pin 63 to move within the slots 56 and break the electric circuit supplying power to the driving motor 43. In the event of a breakage of either shear pin 68 the associated pin 63 in its limited movements in the slots 56 maintains the connection of the associated wheel carriage with the intermediate carriage 41 and prevents the associated bucket wheel carriage from coasting freely from the assembly.

While the invention has been shown and described with respect to one overall type of reclaiming mechanism and with respect to one mechanism intermediate the reclaiming units and with regard to a specific type of hinge connection between the reclaiming units and the carriage which serves to move them longitudinally of the bridge member it will be appreciated that changes may be made in the overall assembly as well as in the specific element. Such modifications and others may be made without departing from the spirit and scope of the invention as set forth in the appended claims.

What is claimed and desired to be secured by Letters Patent is:

1. In apparatus for removing granular material from a pile, an elongated horizontally disposed bridge structure, rails on said bridge structure extending lengthwise thereof, a first carriage supported on and guided by said rails, a bucket wheel supported by said first carriage for removing granular material from the pile, a second carriage supported on and guided by said rails, a bucket wheel supported by the second carriage for removing granular material from said pile, a carriage intermediate the first and second carriages, means connecting the first carriage to one end of the intermediate carriage, means connecting the other end of the intermediate carriage to the second carriage, an electric motor and means associated therewith supported on said intermediate carriage for moving all of the carriages lengthwise of the bridge structure, an electrical circuit to said motor, means responsive to predetermined relative movements in one of said connecting means interrupting said circuit, and said means connecting the intermediate carriage to the other of carriages include shear pins.

2. In apparatus for removing granular material from a pile, an elongated horizontally disposed bridge structure adapted to span the pile, rails on said bridge structure extending lengthwise thereof, a first carriage supported on and guided on by said rails, a bucket wheel supported by said first carriage for removing granular material from the pile, a second carriage supported on and guided by said rails, a bucket wheel supported by the second carriage for removing granular material from said pile, a carriage intermediate the first and second carriages, means including a shear pin connecting the first carriage to one end of the intermediate carriage, means including a shear pin connecting the other end of the intermediate carriage to said second carriage, an electric motor and means associated therewith supported on said intermediate carriage for moving said carriages lengthwise of the bridge structure, an electric circuit to said motor, means responsive to breakage of either shear pin interrupting said circuit, and means limiting movement of the first or second carriage from the intermediate carriage upon occurrence of a broken shear pin.

3. In an apparatus for removing material from a pile, a bridge, a first carriage movable along said bridge, means supported on said carriage for removing material from a pile, a second carriage mounted on said bridge and movable thereon, drive means on said second carriage for moving said second carriage back and forth along said bridge, connecting means connecting said second carriage to said first carriage in a manner to transmit driving force from said first carriage to said second carriage to effect movement of the first carriage back and forth along the bridge, said connecting means comprising a shear pin mounted in one of said carriages, a second pin mounted in the other of said carriages, one of said pins being received in the other of said pins for transmission of driving forces for moving said first carriage through said pins.

4. The apparatus for removing material as set forth in claim 3, including said pins being movable relative each other while in drive transmitting relationship a limited amount in a direction at right angles to the path of movement of said carriages.

5. The apparatus for removing material according to claim 3 including means forming a slot in one of said pins extending at right angles to the path of movement of said carriages, the other of said pins being received in said slot for movement in said slot a limited amount at right angles to the direction of movement of the carriages.

6. The apparatus of claim 5 including a sleeve, said second pin being mounted in said sleeve and said sleeve being received in and being in engagement with the walls of said slot for movement therealong.

7. The apparatus of claim 3 including said drive means comprising an electric motor, an electrical circuit for said motor, means operatively responsive to breakage of one of said pins for interrupting said circuit to said motor.

8. The apparatus of claim 3 including said second pin extending through a slot formed in one of said carriages, said slot extending parallel to the path of movement of said carriages whereby upon a load above the strength of said shear pin being applied thereto said second pin can move within said slot in said one of said carriages as said shear pin shears, said second pin being affixed to means connected to the other of said carriages which will retain said second pin within the latter slot in said one of said carriages whereby driving connection between said carriages will be maintained upon shearing of the shear pin.

9. The apparatus of claim 8 including means forming part of an electrical circuit connected to said carriages, and means connected to said carriages and connected to said part of said circuit which upon relative movement of said second pin within said second slot will break said electrical circuit.

References Cited by the Examiner
UNITED STATES PATENTS

| | | | |
|---|---|---|---|
| 995,648 | 6/1911 | Wright | 104—25 |
| 2,201,017 | 5/1940 | Wehr | 104—25 |
| 2,241,142 | 5/1951 | Kvalhem. | |
| 2,598,757 | 6/1952 | Brunsell | 180—14.5 X |
| 2,605,914 | 8/1952 | Hala. | |
| 3,069,027 | 12/1962 | Discherger | 214—11 |

HUGO O. SCHULZ, *Primary Examiner.*

MORRIS TEMIN, *Examiner.*